(12) United States Patent
Tunaru et al.

(10) Patent No.: US 10,211,982 B2
(45) Date of Patent: Feb. 19, 2019

(54) METHOD FOR GENERATING A GROUP SECRET KEY BASED ON THE RADIO PHYSICAL LAYER AND WIRELESS TERMINAL ASSOCIATED THEREWITH

(71) Applicant: Commissariat a L'Energie Atomique et aux Energies Alternatives, Paris (FR)

(72) Inventors: Iulia Tunaru, Grenoble (FR); Benoit Denis, Grenoble (FR); Regis Perrier, Saint-Martin-d'Heres (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 123 days.

(21) Appl. No.: 15/230,939

(22) Filed: Aug. 8, 2016

(65) Prior Publication Data

US 2017/0048065 A1    Feb. 16, 2017

(30) Foreign Application Priority Data

Aug. 13, 2015 (FR) ..................... 15 57728

(51) Int. Cl.
*H04L 9/08* (2006.01)
*H04L 29/06* (2006.01)
(Continued)

(52) U.S. Cl.
CPC .......... *H04L 9/0877* (2013.01); *H04L 9/0833* (2013.01); *H04L 9/0875* (2013.01);
(Continued)

(58) Field of Classification Search
CPC . H04L 9/0877; H04L 63/0442; H04L 69/323; H04L 63/061; H04L 9/0833;
(Continued)

(56) References Cited

U.S. PATENT DOCUMENTS 8,238,551 B2 * 8/2012 Reznik ............... H04K 1/00
380/44
8,270,602 B1 * 9/2012 Forman ............. H04L 9/0875
380/255

(Continued)

FOREIGN PATENT DOCUMENTS

DE   10 2012 215 326 A1    3/2014
WO   WO 2006/130725 A2   12/2006
WO   WO 2008/045532 A2    4/2008

OTHER PUBLICATIONS

Tunaru et. al., "Cooperative Group Key Generation Using IR-UWB Multipath Channels", 2015, IEEE, pp. 1-5. (Year: 2015).*

(Continued)

*Primary Examiner* — Matthew Smithers
(74) *Attorney, Agent, or Firm* — Oblon, McClelland, Maier & Neustadt, L.L.P.

(57) ABSTRACT

A method for generating a secret key shared by a group of at least three terminals from characteristics of wireless communication channels connecting the terminals in twos, including, at each of the terminals of the group, the implementation of the following steps of: acquiring signals from wireless communication channels, known as adjacent channels, connected to the terminal and generating a representation of each adjacent channel; for at least one wireless communication channel, known as a non-adjacent channel, not connected to the terminal, acquiring at least one image signal of the non-adjacent channel and generating a representation of the non-adjacent channel, determining the secret key from a combination of the representations of the adjacent channels and at least one representation of non-adjacent channel.

10 Claims, 3 Drawing Sheets

(51) Int. Cl.
    *H04L 29/08* (2006.01)
    *H04W 4/06* (2009.01)
    *H04W 12/04* (2009.01)
    *H04W 80/00* (2009.01)

(52) U.S. Cl.
    CPC ........ *H04L 63/0442* (2013.01); *H04L 63/061* (2013.01); *H04L 69/323* (2013.01); *H04W 4/06* (2013.01); *H04W 12/04* (2013.01); *H04L 2209/80* (2013.01); *H04W 80/00* (2013.01)

(58) Field of Classification Search
    CPC .. H04L 9/0875; H04L 2209/80; H04W 12/04; H04W 4/06; H04W 80/00
    See application file for complete search history.

(56) References Cited

U.S. PATENT DOCUMENTS

| | | | | |
|---|---|---|---|---|
| 8,873,755 | B2* | 10/2014 | Mathur | H04L 9/0875 380/262 |
| 9,319,877 | B2* | 4/2016 | Ando | H04W 12/04 |
| 2007/0165845 | A1* | 7/2007 | Ye | H04L 63/061 380/30 |
| 2008/0075280 | A1 | 3/2008 | Ye et al. | |
| 2008/0089518 | A1 | 4/2008 | Reznik et al. | |
| 2010/0167742 | A1* | 7/2010 | Rajagopalan | H04W 92/20 455/436 |
| 2012/0106739 | A1* | 5/2012 | Ly | H04L 9/0875 380/270 |
| 2014/0219449 | A1* | 8/2014 | Shattil | H04W 12/08 380/270 |
| 2015/0334093 | A1* | 11/2015 | Mueller | H04L 9/0875 713/171 |
| 2017/0048063 | A1* | 2/2017 | Mueller | G09C 1/00 |

OTHER PUBLICATIONS

Madiesh et al., "Secret Key Generation and Agreement in UWB Communication Channels", 2008, IEEE, pp. 1-5. (Year: 2008).*
French Preliminary Search Report dated Jun. 22, 2016 in French Application 15 57728, filed Aug. 13, 2015 (with English Translation of Categories of Cited Documents).
U.S. Appl. No. 14/349,903, filed Apr. 4, 2014, 2014/0256353 A1, Benoit Denis et al.
U.S. Appl. No. 14/351,971, filed Apr. 15, 2014, 2014/0287776 A1, Benoit Denis et al.

* cited by examiner

METHOD FOR GENERATING A GROUP SECRET KEY BASED ON THE RADIO PHYSICAL LAYER AND WIRELESS TERMINAL ASSOCIATED THEREWITH

TECHNICAL FIELD

The field of the invention is that of wireless communications secured by means of a secret key shared between a transmitting part and a receiving part. The invention more particularly relates to generating a group secret key making use of the characteristics of only the radio transmission physical layer.

STATE OF PRIOR ART

Security and confidentiality of communications are two major issues within wireless communication networks in order to best ensure collecting, transmitting, and exchanging sensitive and/or personal data.

A first securing technique consists in using a couple formed by a public key and a secret key (asymmetric cryptography) enabling functions of authentifying and/or distributing other secret, typically symmetric keys (for example session keys), to be ensured, the latter ensuring the ciphering of communication. However, this technique requires the resort to a centralized entity to distribute, refresh or revoke the keys or signatures. Incidentally, the latter aspect raises a problem within the context of distributed networks, allowing low radio transmission ranges and/or having changing network topologies (for example because of the mobility of the radio nodes). Further, the implemented algorithms are complex and use significant computational resources whereas the terminals can have only limited (energy, computational) resources.

Another securing technique consists in ciphering the communications using a symmetric secret key (symmetric cryptography). The secret key should then be shared between the transmitting part (conventionally known as Alice) and the receiving part (conventionally known as Bob) and not be allowed to be directly intercepted, nor guessed based on locally made observations, by a possible spy ("eavesdropper") (conventionally known as Eve). Therefore, this technique implies a prior agreement between Bob and Alice about the secret key, which in practice raises distribution problems. What is more, the secret key should be able to be regularly securely renewed.

A solution is known, which consists in generating secret keys from only the properties of the wireless communication link to be protected. According to this solution, Alice's and Bob's terminals come to measure certain radio metrics (for example, the impulse responses of the communication channel connecting the terminals, or sequences of received power) in order to extract a common secret key.

This solution takes advantage of the bidirectional reciprocity between the forward link and the backward channel and the "spatial" decorrelation of the wireless communication channels. More precisely, the impulse response of the communication channel between Bob and Alice is theoretically identical, to the noise, to that of the communication channel between Alice and Bob. Alice and Bob can thus separately construct the same secret key from an estimation of the communication channel connecting them, made on either side of the link. On the other hand, as soon as Eve's terminal is located at more than a few wavelengths from Bob's (in the case of narrow band communications), the communication channel between Alice and Eve (respectively between Bob and Eve) has characteristics decorrelated from that between Alice and Bob (respectively between Bob and Alice). Therefore, it is not easy for Eve to generate the same secret key by simply listening to the channel between Alice and itself or between Bob and itself. Finally, the communication channel between Alice and Bob is generally subject to time variations in its characteristics, in particular when either party moves. The secret key can thus be renewed, or its length can be increased.

This solution thus provides a symmetric key shared by two terminals and generated from a single communication link. The security however would be increased if it were possible to generate the key from more entropic measures than those made on a single communication link between two terminals. For this, it can be attempted to extend the method for generating a key to several terminals in order to make use of more physical links and generating a key shared by a group of terminals enabling the communications between the terminals of the group to be secured.

Patent application US 2008/0075280 A1 thus sets forth a method for generating a group key. According to this method, peer to peer keys, shared by only two terminals of the group, are first generated. Then, a group key is propagated in the terminal network by using peer to peer keys and iterative graph computations. The length of the group key is however limited by the minimum length of each of the peer to peer keys, which limits the performances in terms of securing and/or does not enable the applicative needs expressed at a higher level to be met (for example an application that can require an a priori length).

DISCLOSURE OF THE INVENTION

The invention aims at extending to a group of terminals the technique of generating peer to peer secret key making use of a single communication link. The purpose is to make use of the diversity of the different links of a mesh network topology in order to generate a group key the length of which can be arbitrarily large, while avoiding having to generate intermediate peer to peer keys.

For this, the invention provides a method for generating a secret key shared by a group of at least three terminals from characteristics of wireless communication channels connecting said terminals by pairs, comprising, at each of said terminals of the group, the implementation of the following steps of:
  acquiring signals from the wireless communication channels, called adjacent channels, connected to the terminal and generating a representation of each adjacent channel;
  for the at least one wireless communication channel, called a non-adjacent channel, not connected to the terminal, acquiring at least one image of the non-adjacent channel, and generating a representation of the non-adjacent channel,
  determining the secret key from a combination of the representations of the adjacent channels and at least one representation of the non-adjacent channel.

Some preferred but non limiting aspects of this method are the following ones:
  it comprises at a terminal called transmitting terminal the following steps of:
    estimating an adjacent channel connecting the transmitting terminal to a destination terminal from the signals acquired from the adjacent channel;
    generating a signal carrying an image of a non-adjacent channel of the destination terminal from the signals acquired by the transmitting terminal from the non-adjacent channel of the destination terminal and from the estimation of the adjacent channel connecting the transmitting terminal and the destination terminal; and transmitting said signal carrying an image of a non-adjacent channel to the destination terminal;

it comprises two acquisitions by one terminal, for a non-adjacent channel, of an image of the non-adjacent channel, each acquisition respectively coming from a transmission by one of both terminals connected by the non-adjacent channel;

the terminal performs a processing of the two acquisitions of an image of the non-adjacent channel for generating a single representation of the non-adjacent channel;

the terminal assesses a channel representation asymmetry from both acquisitions of an image of the non-adjacent channel, and transmits channel representation asymmetry information to the terminals connected by the non-adjacent channel;

the terminal modifies a representation of an adjacent channel following reception of channel representation asymmetry information.

The invention also extends to a terminal able to generate a secret key in accordance with the invention.

BRIEF DESCRIPTION OF THE DRAWINGS

Further aspects, objects, advantages and characteristics of the invention will better appear upon reading the following detailed description of preferred embodiments thereof, given by way of non-limiting example, and made in reference to the appended drawings in which.

DETAILED DISCLOSURE OF PARTICULAR EMBODIMENTS

Figure 1:
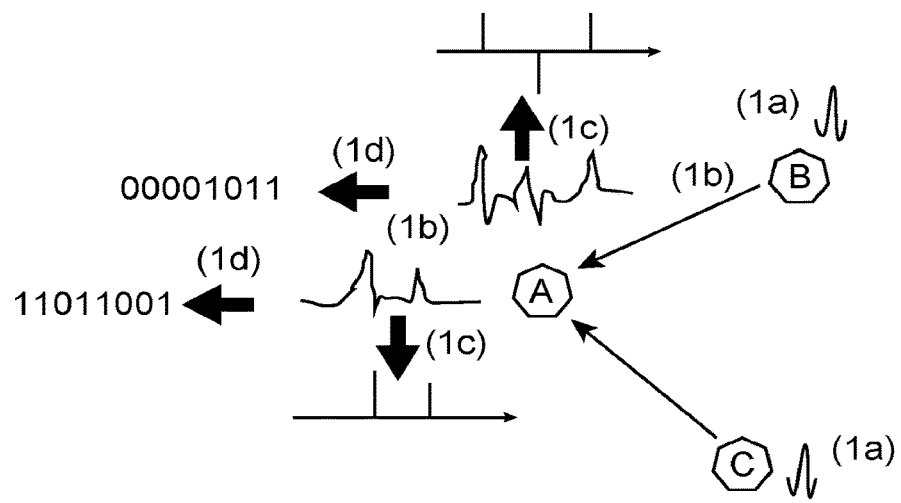
FIGS. 1 to 4 are diagrams illustrating the different steps of the method according to the invention.

The invention relates to a method for generating a secret key shared by a group of at least three terminals, the key being generated from characteristics of the wireless communication channels connecting two said terminals to each other.

By terminal, it is intended a fixed or mobile communication equipment, for example a user terminal, a base station, a local access point, a sensor, a communicating object. The terminals are part of a communication network with a mesh topology in which each terminal has a point to point link with each of the other terminals. In the continuation of the description, by channel adjacent to a terminal, it is meant a wireless communication channel connected to the terminal, and by non-adjacent channel, it is meant a wireless communication channel not connected to the terminal and which therefore connects two other terminals to each other. Taking the example of a network with three terminals A, B and C, the channels A-B and A-C are channels adjacent to the terminal A whereas the channel B-C is a channel non-adjacent to the terminal A.

The method according to the invention relies on the general idea to generate a group secret key by making at each terminal, not only an acquisition of adjacent channels, but also an observation of the images of the non-adjacent channels. As will be detailed later, for this, specific signals are exchanged in order to enable a terminal to have an image of its non-adjacent channels.

For the rest of the document, the following terminology will be used.

"Acquisition" or "acquired signal" will designate any direct measure from an adjacent channel after a first direct sampling (for a conventional reception chain comprising an analog-digital converter), "estimation of the channel" will designate any signal from a step of processing the acquired signal to deduce the effect of the physical channel onto the transmitted signals (concretely, a multi-path estimation for example), "representation of the channel" will designate any acquired signal processed for generating a "binary sequence" led to make up (after correction) the key. By way of example, a channel estimation can also be a representation of the channel but a representation of the channel is not necessarily an estimation.

Generally, any transmission can be modeled by $cx(t)=(x*h)(t)+w(t)$ in the continuous domain and by $cx[n]=(x*h)[n]+w[n]$ after acquisition via a sampling, with:

$x(t)$ the transmitted signal;

$cx(t)$ the acquired signal, from the convolution of the signal transmitted with the impulse response of the channel;

$h(t)$ the impulse response of the channel (for example a Diracs comb $h(t)=\Sigma\alpha_i\delta(t-t_i)$ with $\alpha_i$ and $t_i$ respectively the amplitude and the delay of the i-th multi-path);

$w(t)$ the reception additive noise.

The acquired signal cx [n] can be post-processed for generating another signal y[k], which will then be used for generating the key using a quantization algorithm.

For the sake of notation, the continuous domain will be used in the following equations whereas the steps of estimating, post-processing, etc. are made on sampled versions of the signals.

Within the scope of the invention, 2 types of transmissions are distinguished:

Transmissions, aiming at estimating the adjacent channel, of a signal $x(t)=p(t)$ which is a pilot known to both parts (transmitter and receiver). The acquired signal is written as $ch(t)=(p*h)(t)+w(t)$. From $p(t)$ and $ch(t)$, the receiver estimates the impulse response of the channel $\hat{h}(t)$ (called an "estimation of adjacent channel");

Transmissions, aiming at inferring a non-adjacent channel h', different from the forward transmission channel h', of a signal $x(t)=s(t)$ which is carrying an image of the non-adjacent channel. The acquired signal is written as $r(t)=(s*h)(t)+w(t)$. The signal s(t) carrying an image of the non-adjacent channel is computed from the estimation of the adjacent channel hand the targeted image such that (to the noise) $(p*h')(t)=(s*h)(t)$.

The method will be described hereinafter by taking the example of a network consisting of three terminals A, B, C. Of course, the invention is not limited to this example given only for simplifying the description and the understanding thereof.

With reference to FIG. 1, during a step (1*a*), terminals B and C transmit a signal for surveying the communication channels adjacent to the terminal A, that is respectively the channel B-A and the channel C-A. These transmissions can be sequential (for example in different time slots in a time division multiple access communication) or simultaneous (for example at different frequencies in a frequency division multiple access communication).

During a step (1b), terminal A acquires the signals transmitted by the terminals B and C from the adjacent channels and carries out, during a step (1c), an estimation of the adjacent channels.

During a step (1d), the terminal A, for each of the adjacent channels B-A and C-A, carries out the generation of a representation of the adjacent channel. This representation will be then transformed into a binary sequence by a quantization operation.

Figure 2:
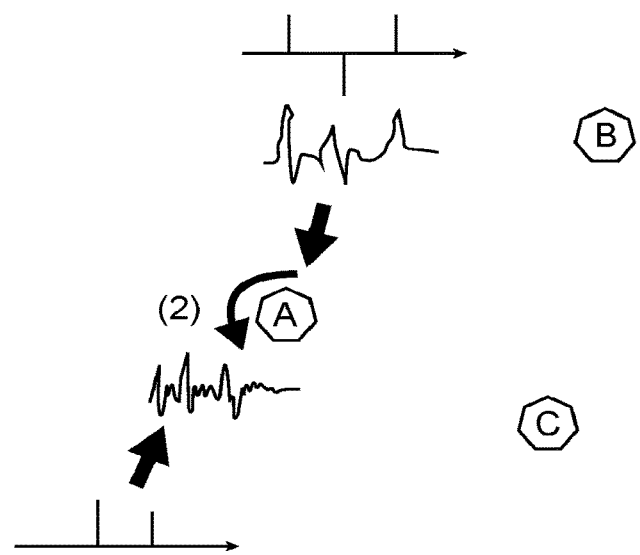

With reference to FIG. 2, and during a step (2), terminal A uses the signals acquired in step (1b) and the estimations of the adjacent channels made in step (1c) to construct a signal carrying information to which its neighbors cannot directly access. For example, if the destination terminal is terminal C, terminal A uses the signal acquired from the channel B-A (before estimating the channel) and the estimation of the channel C-A for generating a specific signal to be sent to C to make it infer the channel B-A (and the same for B). This specific signal is for terminal C a signal carrying an image of the non-adjacent channel (herein the non-adjacent channel B-A).

Figure 3:
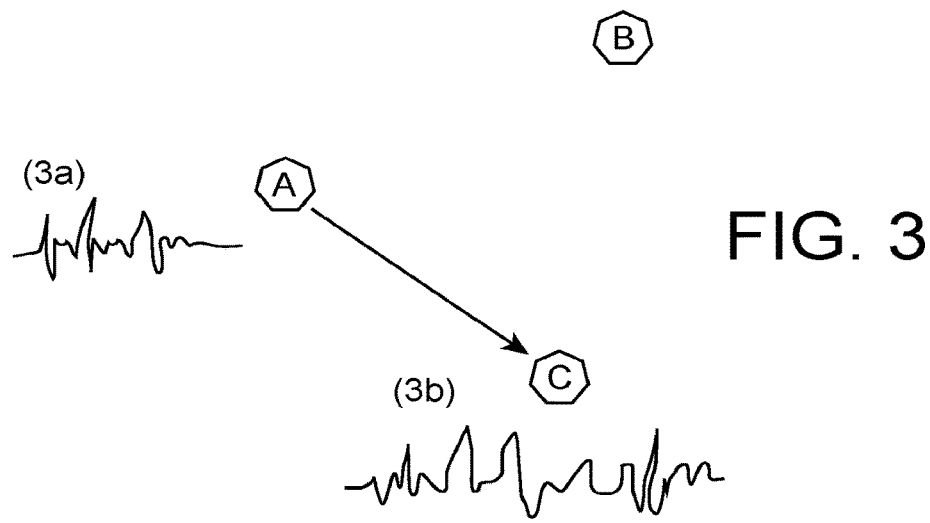

With reference to FIG. 3, this signal is transmitted during a step (3a) to the terminal C in order to provide an image of the non-adjacent channel B-A to the same terminal C. During a step (3b), terminal C acquires the signal transmitted by terminal A and which is an image of the channel B-A non-adjacent to terminal C.

Figure 4:
Figure 4:
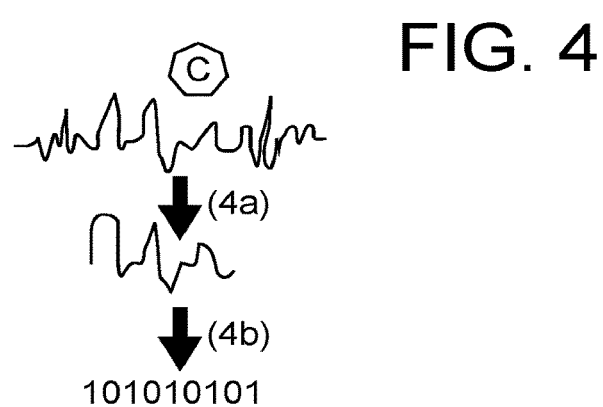

With reference to FIG. 4, during a step (4a), terminal C carries out the recovery of a useful portion of the acquired signal representing the image of the channel B-A, for example by means of a time windowing. During a step (4b), terminal C generates, from the direct observation of this acquired signal, a representation of the non-adjacent channel B-A. A bit sequence can then be extracted from this representation of non-adjacent channel, for example by means of a quantization.

The previously mentioned different steps are reiterated by making at each iteration a rotation of the roles of each of the terminals A, B and C. The reiteration is continued until each terminal has, for each of the adjacent channels, the bit sequence representative of the adjacent channel and, for each of the non-adjacent channel(s), the bit sequence representative of the non-adjacent channel.

Each terminal comes to combine these different sequences, for example by concatenating them, and makes use of this combination to compute the secret key. An error correcting code can then be applied to the combination of the different sequences by exchanging minimum information about a public channel.

It is understood from above that the method according to the invention comprises, at each of said group terminals, the implementation of the following steps.

Each terminal first carries out an acquisition of the adjacent channels and then independently: i) an estimation (meaning extraction of the multi-path components) of the wireless communication channels connected to the terminal (adjacent channels) and ii) generation of the representations of these adjacent channels which will be then converted into binary sequences representative of the adjacent channels.

Taking the example of the terminal A, it carries out thereby the acquisition of the channels B-A and C-A. Then, terminal A, known as a transmitting terminal, generates a signal carrying an image of a non-adjacent channel B-A of a destination terminal C from the direct observation (acquisition) of the non-adjacent channel B-A of the destination terminal C and the estimation of the adjacent channel C-A connecting the transmitting terminal A and the destination terminal C. Transmitting terminal A transmits this signal carrying an image of the channel B-A to the destination terminal C.

This signal is thus built as the transmitted signal which, once it is convoluted with the estimation of the channel C-A, will directly produce at the receiver C an image, ideally as close as possible, of the channel B-A previously acquired by A (i.e. before channel estimation). To build this signal to be transmitted, terminal A therefore needs the estimation of the channel C-A (typically as a weighted Diracs comb) and the direct observation of the channel B-A (i.e. its acquisition).

The destination terminal receives, for each wireless communication channel not connected to the terminal (non-adjacent channel) at least one signal image of this same non-adjacent channel. Thus, upon reiterating the steps illustrated in FIGS. 1 to 4, terminal A in turn acquires on the channel B-A a signal image of the non-adjacent channel C-B of the terminal A.

Terminal A obtains a representation of the non-adjacent channel from the at least one signal image of the non-adjacent channel, and generates a binary sequence representative of the non-adjacent channel. Then, it comes to determine the secret key from a combination of binary sequences representative of all the adjacent and non-adjacent channels.

In one possible embodiment, a terminal can receive two images of a same non-adjacent channel, each transmitted by one of both terminals connected by the non-adjacent channel. Still taking the example of terminal A, it acquires on the channel C-A an image of the channel B-C and on the channel B-A an image of the channel C-B.

The terminal can carry out a processing of both images of non-adjacent channel to generate the representation of the non-adjacent channel. This processing can for example implement a sampling and coherent integrations of the sampled signals (i.e. a term to term average of both signals).

The terminal can also make use of both these images of non-adjacent channel to assess a channel representation asymmetry by each of the terminals connected to the non-adjacent channel. This asymmetry can result from channel estimation errors or simply a change in the channel characteristics over time.

The terminal can transmit channel representation asymmetry information to the terminals connected by the non-adjacent channel, for example through a public channel (information not sufficient for an attacker). These terminals will then be able to modify the binary sequence representative of their adjacent channel following reception of such information. For example, either and/or both terminals B and C will be able to modify, for example by puncturing, their binary sequence representative of the channel B-C/C-B as a result of information transmitted by A for a representation asymmetry for the channel B-C/C-B.

This asymmetry information relates for example to samples the terminal A considers as asymmetric in the representations from the signals acquired by both terminals B, C connected by the non-adjacent channel. These samples can be ignored by these terminals in their own acquisitions.

A terminal can on the other hand be led to modify a binary sequence representative of an adjacent/non-adjacent channel following reception of guard band information. This modification is a rejection of the samples close to the quantization thresholds. Information relating to the rejected samples can be shared with the other terminals through the public channel.

Figure 5:
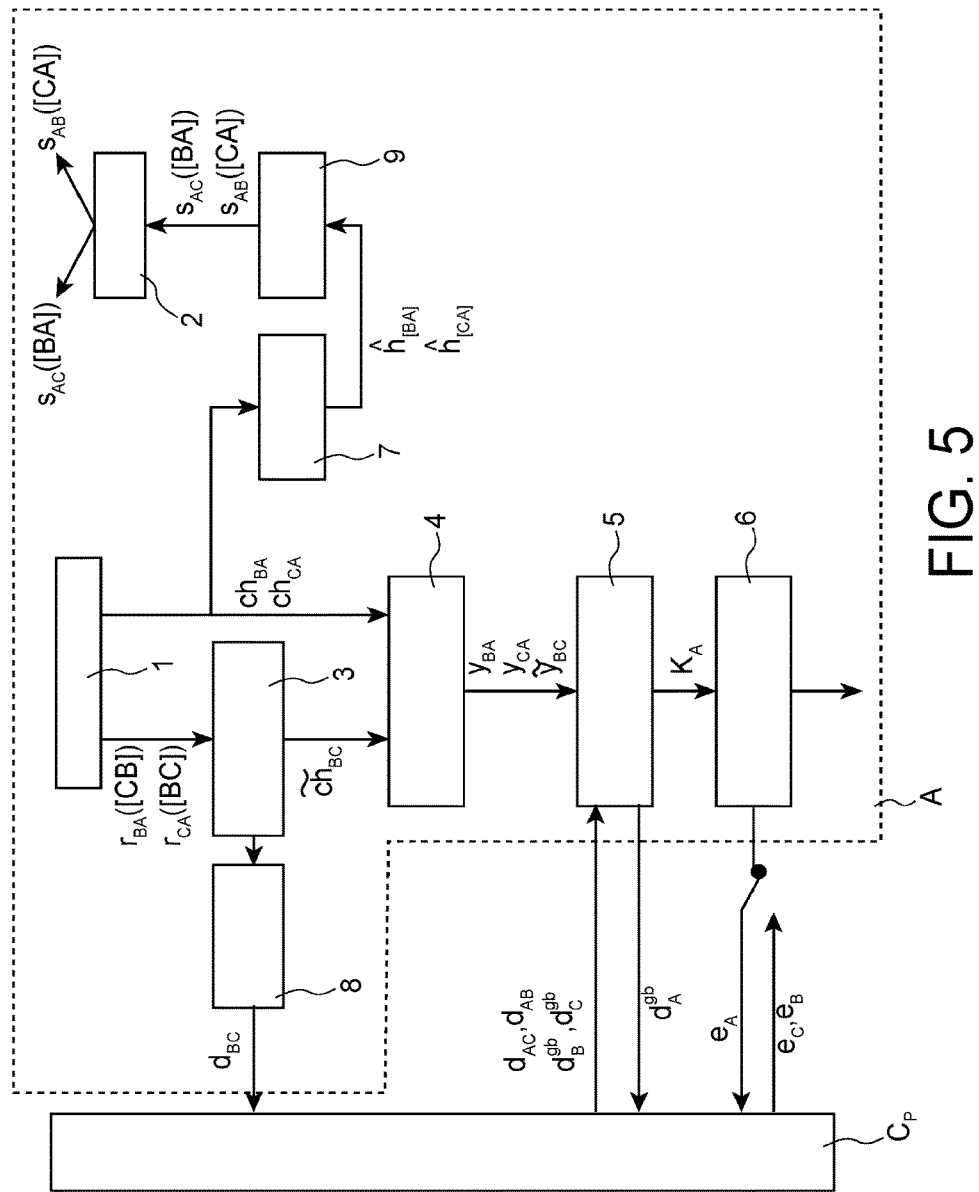
FIG. 5 is a diagram of a wireless communication terminal able to be generate a secret key in accordance with the method according to the invention.

FIG. 5 represents a diagram of a wireless communication terminal A able to generate a secret key in accordance with the method according to the invention. It comprises a receiving unit 1 configured to receive signals from the adjacent channels and a transmitting unit 2 configured to transmit signals onto the adjacent channels.

The receiving unit 1 is in particular configured to receive the surveying signals $ch_{BA}$, $ch_{CA}$ for the adjacent channels, and to receive, for each non-adjacent channel, at least one image of the non-adjacent channel. In FIG. 5, the receiving unit 1 thus acquires from the channel B-A, the surveying signal $ch_{BA}$ and a signal $r_{BA}([CB])$ image of the non-adjacent channel C-B and from the channel C-A, the surveying signal $ch_{CA}$ and a signal $r_{CA}([BC])$ image of the non-adjacent channel B-C.

The transmitting unit 2 is in turn in particular configured to transmit a signal carrying an image of non-adjacent channel to each terminal not connected to said adjacent channel. In FIG. 5, the transmitting unit 2 thus transmits on the channel A-B a signal $s_{AB}([CA])$ carrying an image of the channel C-A non-adjacent to the terminal B and on the channel A-C, a signal $s_{AC}([BA])$ carrying an image of the channel B-A non-adjacent to the terminal C.

Terminal A comprises on the other hand an extraction unit 3 configured to determine, for each non-adjacent channel, a single observation $\overline{ch}_{BC}$ from at least one acquisition $r_{BA}([CB])$, $r_{CA}([BC])$ of signal image of the non-adjacent channel.

Terminal A comprises on the other hand a channel representation generating unit 4 configured to generate representations of the adjacent channels $y_{BA}$, $y_{CA}$ from the received surveying signals $ch_{BA}$, $ch_{CA}$ from the adjacent channels B-A, C-A, and to generate a representation of a non-adjacent channel $\tilde{y}_{BC}$ from the single observation $\overline{ch}_{BC}$ of the non-adjacent channel B-C from the extraction unit 3.

Terminal A further comprises a key generator 5 configured to determine the secret key $K_A$ from a combination of the representations of the adjacent channels $y_{BA}$, $y_{CA}$ and a representation $\tilde{y}_{BC}$ of each non-adjacent channel.

The key generator 5 carries out for example a quantization of all the samples by using an arbitrary binary dictionary. In a possible embodiment, the quantization is made after receiving guard band information $d_B^{gb}$, $d_C^{gb}$ and optional rejection of the samples close to the quantization thresholds. The information relating to the rejected samples $d_A^{gb}$ can be shared on a public channel C.

Terminal A also comprises an encoding/decoding unit 6 enabling an error correcting code to be applied to the calculated key $K_A$. This unit 6 is able to exchange information on a public channel $C_P$, by indicating error information $e_A$ affecting the key $K_A$ or recovering error information $e_B$ or $e_C$ affecting the key calculated by another terminal B or C.

By way of example, the error correcting code can be an LDPC code or Reed-Solomon code. One of the terminals can be designated as a main terminal in charge of generating a syndrome representing its key and sending it on the public channel $C_P$. The other terminals then make use of this information to correct their key with respect to that of the main terminal.

Terminal A comprises on the other hand an adjacent channel estimating unit 7 configured to determine an estimation $\hat{h}_{[CA]}$, $\hat{h}_{[BA]}$ of the adjacent channels C-A, B-A from the surveying signals $ch_{CA}$, $ch_{BA}$.

The terminal comprises a unit 9 for generating signals carrying an image of non-adjacent channel $s_{AB}([CA])$, $s_{AC}([BA])$ from the estimations, $\hat{h}_{[BA]}$, $\hat{h}_{[CA]}$ of the adjacent channels B-A, C-A and the acquisitions $ch_{CA}$, $ch_{BA}$ of these adjacent channels.

This unit 9 can make use of a least squares optimizing algorithm the using a prior knowledge of the signal searched for (for example a constraint of smoothing its derivatives) to increase the algorithm stability. The unit 9 can also make use of an Expectation Maximization (EM) algorithm which can together deduce the signal searched for and the statistical parameters of the model used for deconvolution.

On the other hand, the terminal A can comprise a channel representation asymmetry assessing unit 8 from the acquisitions $r_{AB}([CA])$, $r_{AC}([BA])$ of both images of a non-adjacent channel. As previously indicated, this unit 8 provides asymmetry information $d_{BC}$ which can relate to samples the terminal A considers as asymmetric in the signals from the representations of both terminals connected by the non-adjacent channel. This information $d_{BC}$ is communicated on the public channel $C_P$. It can be used by the key generator 5 as represented in FIG. 5 by the information $d_{AC}$ and $d_{AB}$ representative of a representation asymmetry of the channels A-C and A-B.

The invention is advantageously applicable in networks making use of the impulse radio ultra wide band (IR-UWB) wireless technology, in particular in wireless sensor networks. Indeed, it provides highly entropic signals because of its multi-path resolution abilities.

Within this scope, the surveying signals are for example pulse signals. The estimation of adjacent channel can be made via a direct sampling of the signal received and a digital inter-correlation with a pulse model corresponding to the expected wave form of the surveying pulse. The estimation can implement techniques enabling the multi-path components of the acquired signal to be detected, estimated and then subtracted. The estimation can also make use of algorithms of parsimonious representation of the channel (for example a "compressed sensing" algorithm), or even rely on a multi-path identification based on the energy which has the advantage of being less complex.

The channel representation generating unit 4 can precisely make an integration of the energy of the received signals (for example by squaring the signal and low pass filtering) over the duration of a pulse in order to obtain decorrelated samples.

The invention is also applicable in networks making use of OFDM signals. Within this scope, the surveying signals can be OFDM pilot symbols and the channel estimation can rely on a multi-dimension search algorithm such as an estimation of the most probable arrival time. Examples of samples delivered by the channel representation generating unit 4 for quantizing purposes are delay and amplitude information, or the OFDM coefficients of the channel response.

The invention claimed is:

1. A method for generating a secret key shared by a group of at least three terminals from characteristics of wireless communication channels connecting said terminals by pairs, comprising, at each of said terminals of the group, the steps of:

acquiring, by a receiver of the respective terminal, signals from the wireless communication channels, called adjacent channels, connected to the terminal and generating a representation of each adjacent channel based on the acquired signals;

for the at least one wireless communication channel, called non-adjacent channel, not connected to the terminal, acquiring at least one image of the non-adjacent channel and generating a representation of the non-adjacent channel based on the at least one acquired image; and combining the representations of the adjacent channels and the at least one representation of the non-adjacent channel to form a combined representation and generating the secret key, which is shared by the group, based on the combined representation.

2. The method according to claim 1, further comprising at a terminal called transmitting terminal the steps of:
estimating an adjacent channel connecting the transmitting terminal to a destination terminal from the signals acquired from the adjacent channel;
generating a signal carrying an image of a non-adjacent channel of the destination terminal from the signals acquired by the transmitting terminal from the non-adjacent channel of the destination terminal and from the estimation of the adjacent channel connecting the transmitting terminal and the destination terminal; and
transmitting said signal carrying an image of a non-adjacent channel to the destination terminal.

3. The method according to claim 1, comprising two acquisitions by one terminal, for a non-adjacent channel, of an image of the non-adjacent channel, each acquisition respectively coming from a transmission by one of both terminals connected by the non-adjacent channel.

4. The method according to claim 3, wherein the terminal performs a processing of both acquisitions of an image of the non-adjacent channel for generating a single representation of the non-adjacent channel.

5. The method according to claim 3, wherein the terminal assesses a channel representation asymmetry from both acquisitions of an image of the non-adjacent channel, and transmits channel representation asymmetry information to the terminals connected by the non-adjacent channel.

6. The method according to claim 5, wherein the terminal modifies a representation of adjacent channel following reception of channel representation asymmetry information.

7. The method according to claim 6, wherein the modification of the representation of the adjacent channel comprises a puncturing.

8. The method according to claim 1, further comprising applying an error correcting code to a binary sequence representing the combined representation.

9. The method according to claim 1, wherein combining the representations of the adjacent channels and the at least one representation of the non-adjacent channel is performed by concatenation.

10. A wireless communication terminal able to generate a secret key from characteristics of wireless communication channels connecting to each other two terminals of a group comprising the terminal and at least two other terminals, comprising:
a receiver configured to:
acquire signals from the wireless communication channels, called adjacent channels, connected to the terminal; and
acquire for the at least one channel, called non-adjacent channel, non connected to the terminal, at least one image of the non-adjacent channel;
a channel representation generator configured to:
generate a representation of each adjacent channel from the signals acquired from each adjacent channel;
for the at least one non-adjacent channel, generate a representation of non-adjacent channel from the acquisition of the at least one image of the non-adjacent channel; and
a key generator configured to combine the representations of the adjacent channels and the at least one representation of non-adjacent channel to form a combined representation and to generate the secret key, which is shared by the group, based on the combined representation.

* * * * *